(No Model.)
L. M. BATTY.
MEANS FOR SECURING PULLEYS TO SHAFTS.
No. 377,661. Patented Feb. 7, 1888.
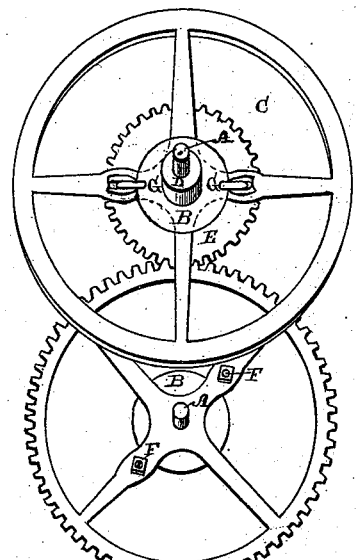
Fig. 1.
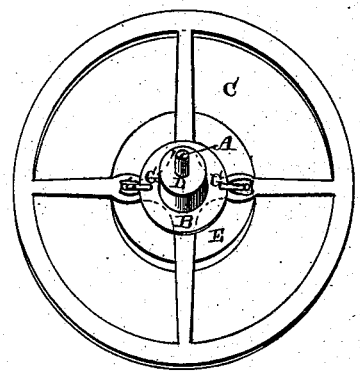
Fig. 2.
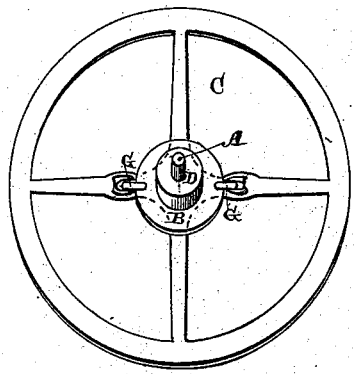
Fig. 3.
Fig. 6.
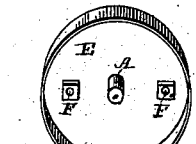
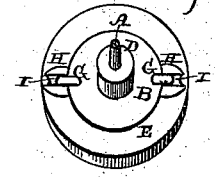
Fig. 5.
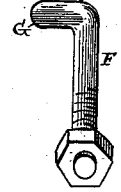
Fig. 7.
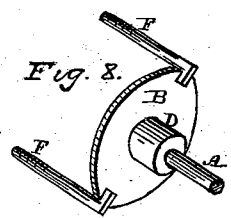
Fig. 8.
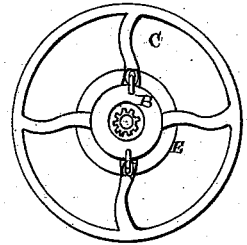
Fig. 4.
WITNESSES:
Lindley M. Batty.
INVENTOR.
N. PETERS, Photo-Lithographer, Washington, D. C.

UNITED STATES PATENT OFFICE.

LINDLEY M. BATTY, OF CANTON, OHIO.

MEANS FOR SECURING PULLEYS TO SHAFTS.

SPECIFICATION forming part of Letters Patent No. 377,661, dated February 7, 1888.

Application filed February 20, 1885. Serial No. 156,570. (No model.)

*To all whom it may concern:*

Be it known that I, LINDLEY M. BATTY, a citizen of the United States, residing at Canton, in the county of Stark and State of Ohio, have invented a new and useful Improvement in Means for Securing Pulleys or Fly-Wheels to Shafts, of which the following is a specification.

My invention relates to an improvement in means for securing pulleys or fly-wheels to shafts, and which is especially adapted for and intended to be used in connection with fly-wheels and pulleys of all kinds; and it consists in the combination of a fly-wheel or pulley, a driving-shaft upon which the fly-wheel or pulley is loosely placed, a friction-disk rigidly secured to the driving-shaft, and two or more bolts which pass through the fly-wheel or pulley, said bolts having bent ends for bearing upon the friction-disk and having nuts for clamping the friction-disk and fly-wheel together, all of which will be more fully described hereinafter.

The object of my invention is to produce a fastening to be used in connection with fly-wheels which are driven by belt or cog gearing, and which is equally well adapted to be used in connection with a pulley alone, but which is more especially intended to be used in connection with agricultural machinery of all kinds—such as feed-cutters, feed-mills, corn-shellers, and root-cutters—and by means of which, when any impediment or obstruction is encountered and the machinery stopped or its motion suddenly decreased, the fly-wheel is allowed to revolve without affecting the gearing, and thus prevent breakage, as would otherwise be the case.

Figures 1, 2, 3, and 4 are side elevations, slightly in perspective, of a device embodying my invention. Fig. 5 shows the fastening as applied to a pulley alone. Figs. 6 and 7 are detail views. Fig. 8 is a perspective of the friction-disk, showing the clamping-bolts applied thereto.

Rigidly secured to the driving-shaft A is the friction-disk B, which has its inner surface to bear against the fly-wheel C, which is loosely placed upon the driving-shaft. Formed as a part of the friction-disk B is the collar D, by means of which the friction-disk is rigidly secured to the driving-shaft in any manner desired. The collar and disk, which is a flange of the collar, being formed as one, an additional frictional disk is done away with, as is necessary in all devices of this character heretofore constructed.

Passing through one or more of the radial arms of the fly-wheel C and the pulley or gear-wheel E, which is placed loosely upon the driving-shaft A, are the clamping-bolts F. One end of each of the bolts F is bent at right angles to its length, as shown at G, Fig. 7, and their opposite ends screw-threaded and provided with nuts. The bent ends G of the bolts F bear upon the surface of the friction-disk B, as shown in Fig. 8, and their opposite ends pass through the fly-wheel and pulley and are provided with nuts, by means of which the friction between the disk, fly-wheel, and bent ends of the bolts is regulated at will. Formed upon one, two, or more of the radial arms or spokes of the fly-wheel just where the bolts F pass through them are the elevations or bosses H, which are equal to or greater in height than the thickness of the disk B, and provided with channels I, in which the bent ends of the bolts rest, and thus prevent the bolts from turning around by the frictional contact of the disk B. If desired, projections or stops of any kind may be formed upon the fly-wheel, instead of the channels, and serve the same purpose. By reason of the bent ends of the bolts F and the lateral strain brought upon them by frictional contact with the disk B sufficient elasticity is obtained to compensate for any unevenness upon the surface of the disk B, and I thus obviate the necessity of using springs or other similar devices, as has been the case heretofore.

In Fig. 5 I show an ordinary pulley attached to a shaft by my method, in which case the disk B bears directly upon the face of the pulley, instead of against the fly-wheel, as shown in Figs. 1, 2, 3, and 4.

By means of a device of the above construction, when it is desired to remove the fly-wheel and pulley from the shaft for convenience in shipping, it is only necessary to loosen the nuts upon the bolts F until the bent ends G can be raised from the channels I, when the ends can be turned around and out of engagement with the disk B and the fly-wheel and pulley removed, leaving the bolts secured thereto in position to have the shaft and disk applied with great ease and rapidity. This obviates the necessity of removing the bolts and nuts, as has been the case heretofore, thus saving a great amount of trouble, as it is not an unfrequent occurrence for the bolts to stick, by reason of rust, dirt, &c.

The above construction is applicable to machinery of all kinds, whether run by belt or cog gearing.

As shown in Fig. 1, the fly-wheel is driven by cogs instead of by belt, as in Fig. 2. In Fig. 1 I also show that all of the wheels in a train of gearing may be applied to their shafts by my method, and thus allowed to revolve freely around their shafts when an obstacle is encountered and the machinery suddenly stopped.

Fig. 3 shows my device applied to a wheel which is driven by a belt passing around its periphery, and in which case the pulley or cog-wheel E, Figs. 1 and 2, is not used, the bolts F passing through the arms of the wheel alone.

Having thus described my invention, I claim—

1. The combination, with a driving-shaft having rigidly secured thereto a friction-disk, of a fly-wheel or pulley having holes made therein beyond the circumference of the friction-disk and provided with projections and clamping-bolts having one end bent at right angles, which bent ends engage the projections and rest upon the surface of the friction-disk, and nuts upon their opposite ends, whereby the pulley and fly-wheel may revolve independently of the shaft, substantially as described.

2. The combination of the fly-wheel C, having channels I, the pulley E, shaft A, disk B, secured rigidly thereto, having the collar D formed as a part thereof, and the bolts F, having the bent ends G, said bolts passing through the fly-wheel and pulley and secured by means of nuts, substantially as set forth.

LINDLEY M. BATTY.

Witnesses:
N. R. SPENCER,
J. L. SPENCER.